Nov. 13, 1923.
J. A. McGARRY
BREAD DUMPING MACHINE
Filed Aug. 25, 1922
1,473,996
5 Sheets-Sheet 1
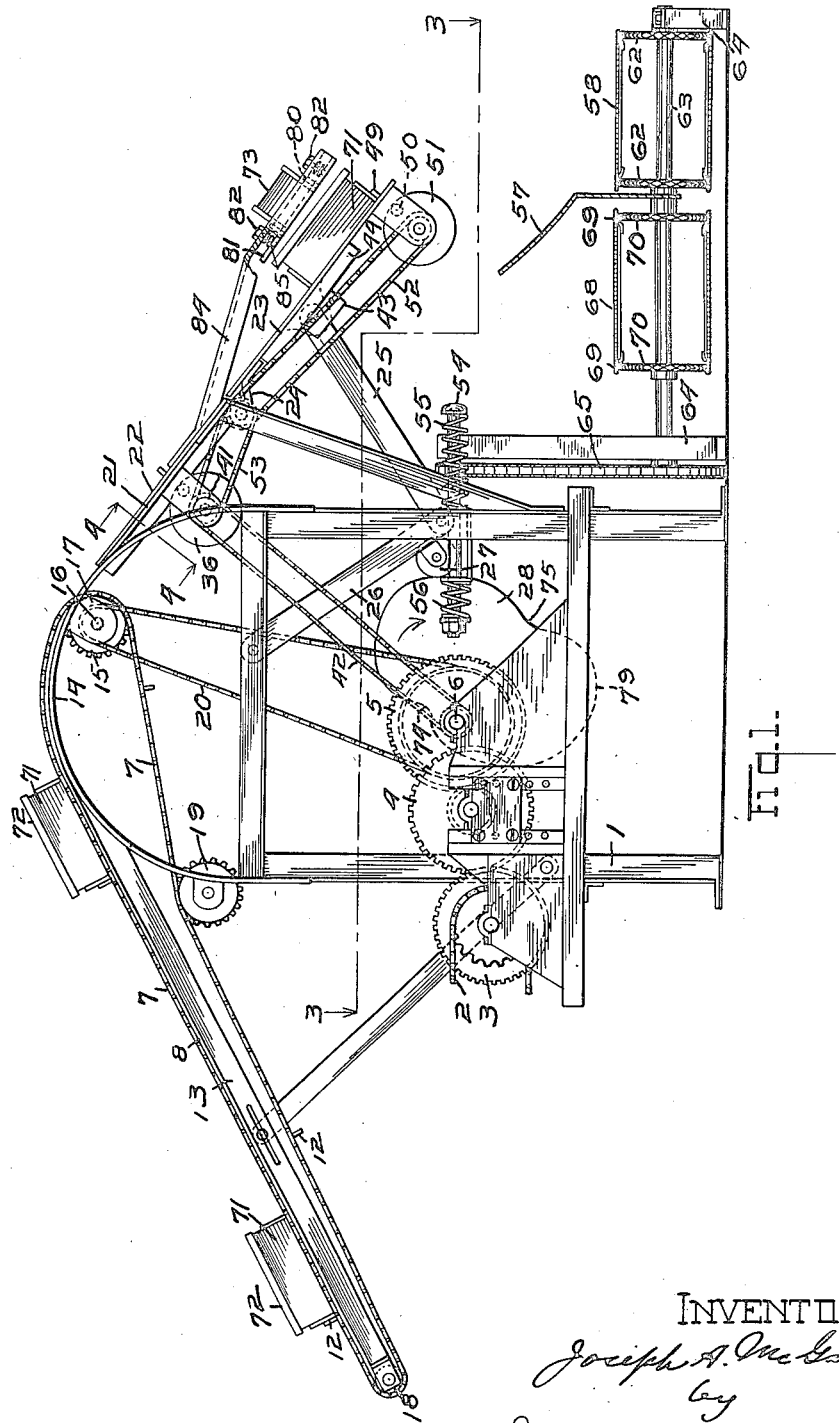
INVENTOR
Joseph A. McGarry
by

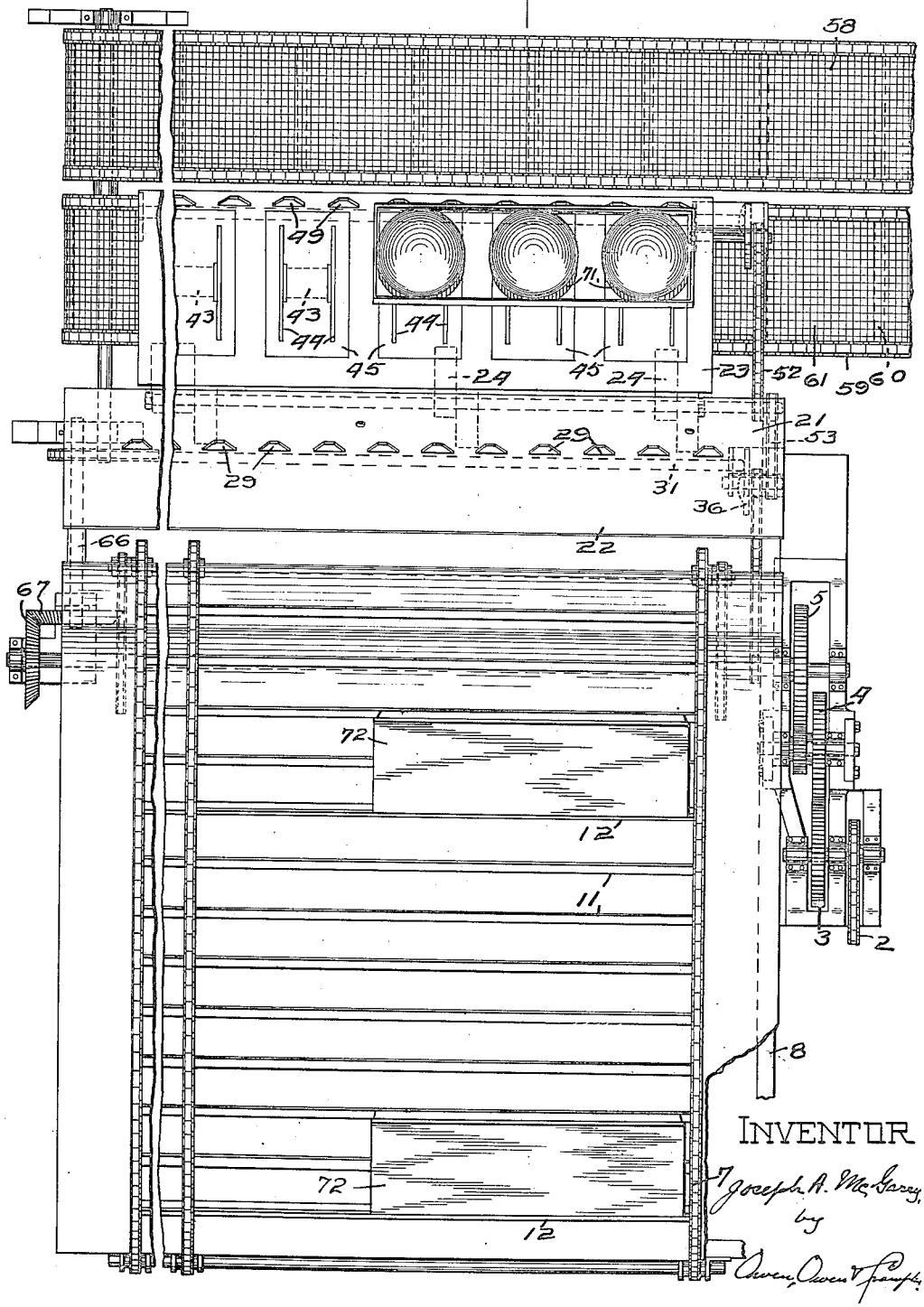

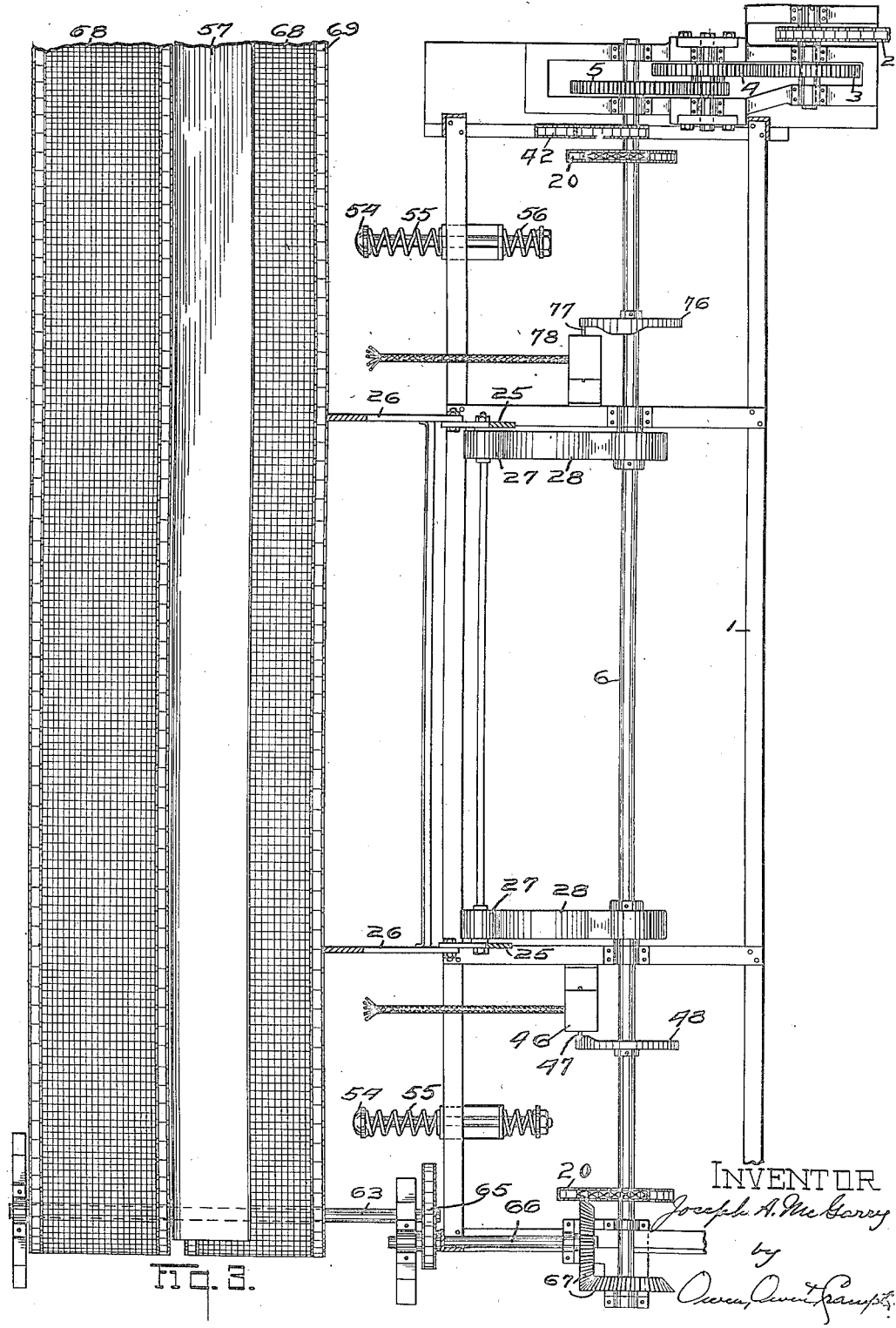

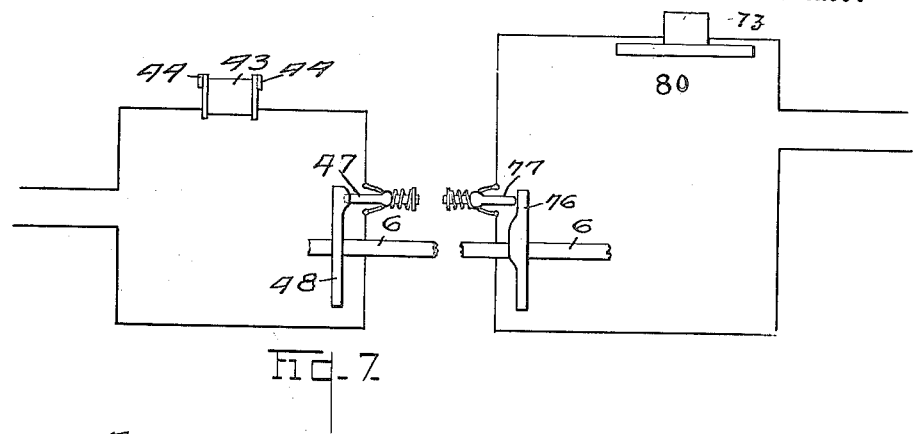
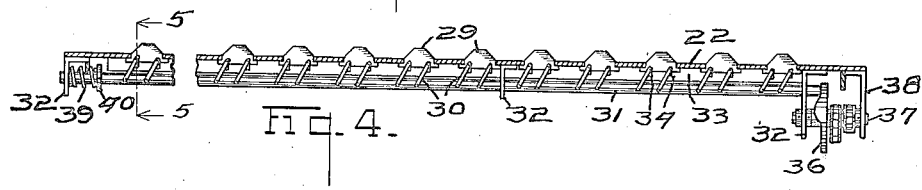
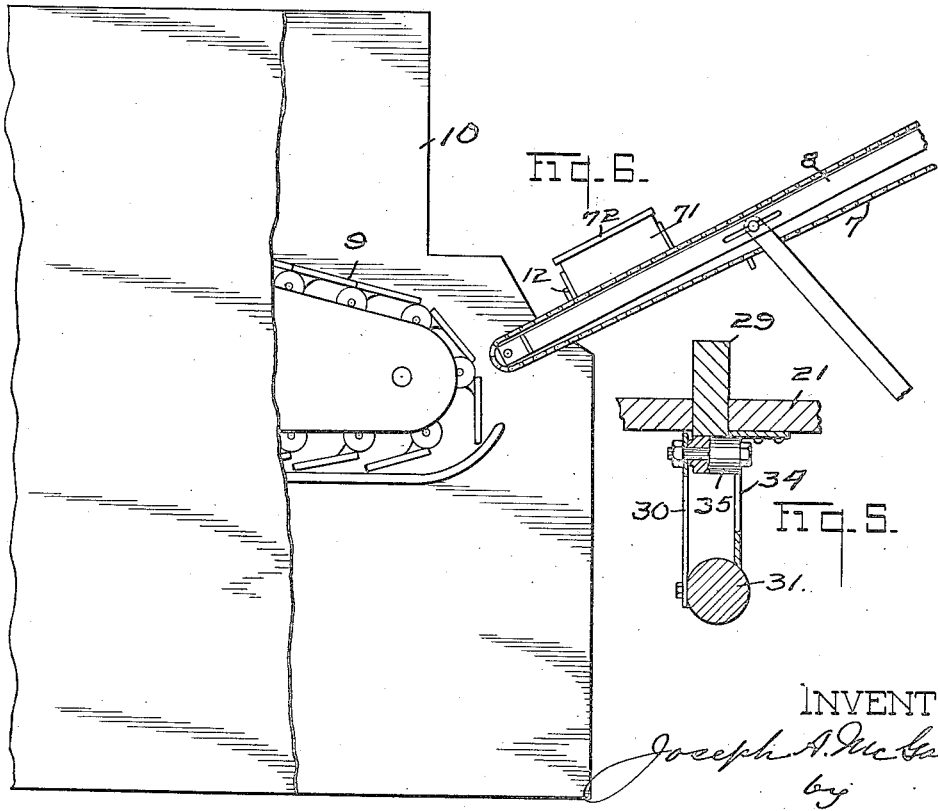

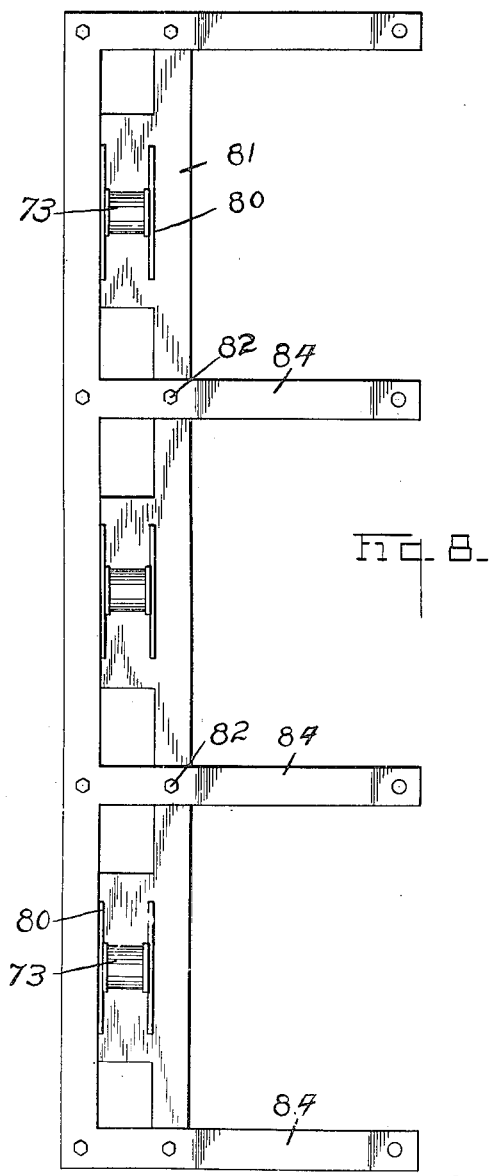

Patented Nov. 13, 1923.

1,473,996

UNITED STATES PATENT OFFICE.

JOSEPH A. McGARRY, OF TOLEDO, OHIO, ASSIGNOR OF ONE-HALF TO JOHN P. O'ROURKE, OF TOLEDO, OHIO.

BREAD-DUMPING MACHINE.

Application filed August 25, 1922. Serial No. 584,196.

*To all whom it may concern:*

Be it known that I, JOSEPH A. McGARRY, a citizen of the United States, and a resident of Toledo, in the county of Lucas and State of Ohio, have made an Invention Appertaining to a Bread-Dumping Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means whereby articles may be automatically removed from supports or containers, wherein there is more or less adherence between the articles and the supports or containers. The invention is particularly adapted for removing baked food products from plates or pans, particularly the removal of bread from pans. Constructions containing the invention may be used in connection with baking ovens of different kinds, and for baking a great variety of baked food products. The invention also has for its object to automatically remove containers from ovens and remove the products baked therein or thereon, and deliver the products and the pans to different places for convenient handling of the products and the pans. Where the pans are provided with covers the invention also has for its further object to remove the covers before dumping the products, and replace the covers after dumping. The invention has for its object other features and advantages which will appear from the following description and from an examination of the drawings.

The invention may be contained in structures of different forms. To illustrate a practical application of the invention I have selected a structure containing the invention as an example of such structures and shall describe it hereinafter. The structure selected is shown in the accompanying drawings.

Figure 1 of the drawings is an end view of the dumping machine. Fig. 2 is a top view of the device illustrated in Fig. 1, the cover removing device having been disconnected from the machine. Fig. 3 is a sectional view taken on the line 3—3 indicated in Fig. 1. Fig. 4 is a sectional view taken on the line 4—4 indicated in Fig. 1. Fig. 5 is a sectional view taken on the line 5—5 indicated in Fig. 4. Fig. 6 is a sectional broken view showing the relation between the dumping machine and parts of the oven, which may be any of the well known types, and the showing of the oven is merely a conventional illustration of an oven having a continuously operated, slowly moving conveyor for conveying bread through the oven while it is being baked. Fig. 7 is a diagram of the circuit connections to the magnets. Fig. 8 is a top view of the cover removing device.

The bread dumping machine has a suitable supporting frame 1 for the parts of the machine. The parts are driven by a belt 2 that is connected to any source of power supply. The belt 2 operates to drive the gear wheel 3 which meshes with a reducing idler 4. The pinion of the idler 4 meshes with the gear wheel 5 that is connected to the main shaft 6 that also operates as a timing shaft in order that the functions of the machine may be performed synchronously. The speed of the shaft 6 relative to the gear wheel 3 may be varied by substituting idlers in place of the idler 4 having the desired ratios between the gear wheels and their pinions.

A conveyor 7 is supported on an apron 8. The outer edge of the apron is located in the vicinity of the delivering point of the conveyor 9 which carries or delivers the bread through or from the oven 10, as shown in Fig. 6. The conveyor 7 is provided with suitable sprocket chains that are connected together by means of cross bars 11 that are disposed in parallel relation and sufficiently close together to support the pans containing the baked bread. The major portion of the bars are flat. The remainder of the bars are L or angle iron bars 12. The angle iron bars 12 are disposed at suitable distances apart and form lips that protrude from the plane of the conveyor to engage the pans and to align a certain number of them across the conveyor as they are carried up on the apron, although this is not the necessary operation of this part of the machine.

The apron formed by the guiding bars 13 and the conveyor is inclined upward and is guided over the top of the curved bars 14 forming a part of the frame 1. The sprocket chains of the conveyor 7 are driven by the sprocket wheels 15 supported on a shaft 16 located in suitable bearings formed in brackets 17 that are attached to the curved bars 14. The conveyor passes around the sprocket wheels 18 located at the receiving edge of the apron and over the sprocket wheels 19 that are supported on the curved bars 14. The sprocket wheels 19 merely operate to remove the slack of the conveyor in order that the conveyor may be kept in close proximity to the lower side of the apron. The conveyor is driven by means of the belt 20 which transmits the power to the sprocket gear 15 from the gear wheel 5 located on the main driving shaft 6.

As the bread pans are delivered from the oven 10 by the conveyor 9 they are engaged by the bars, and particularly the bars 11 of the conveyor 7, and carried up over the apron and delivered on to the table 21. The table 21 is provided with a fixed receiving part 22 and a delivering part 23. The parts are formed of plates that extend across the delivering end of the conveyor 7. The parts of the table are hinged together by suitable pintles that pass through brackets 24. The receiving part of the table is supported on the frame 1 and is rigidly connected thereto, while the delivering part of the table is not only supported by the hinges formed by the brackets 24, but also by the pivoted bars 25 that are pivotally connected to the part 23 of the table and to the link bars 26. Each of the link bars 26 is connected to the frame 1 at one end and to the end of a bar 25 at the other end. Rollers 27 are connected to some point in the bars 25 and 26. As shown in the drawings, they are connected to the bars 26 near the joints between the bars 25 and 26. The pressure produced by the weight of the table 23, the parts connected therewith or located thereon are sustained by means of the cams 28 against which the rollers rest. The cams 28 are connected to the main driving and timing shaft 6. The cam 28 is designed to produce certain movements of the part 23 of the table, as hereinafter described, and for the purposes set forth.

The table 21 is inclined so that when the pans containing the baked bread are delivered on to the part 22 they will slide downward along the surface of the table. The part 22 is provided with a plurality of engaging fingers for engaging the pans and momentarily holding them on the receiving part of the table.

The fingers or lips 29 extend through openings formed in the receiving part of the table, and are connected by means of links 30 to a sliding bar 31. The sliding bar is supported in suitable brackets 32 on the underside of the part 22 of the table. A plate 33 is also secured to the underside of the table and is provided with slots 34. The lips or fingers 29 are provided with rollers 35 that extend through the slots 34, as particularly shown in Fig. 5. The links 30 are inclined to the horizontal so that when the bar 31 is slid longitudinally the rollers operating in the slots 34 draw the fingers 29 below the top of the table and upon the return of the bar the fingers are again raised below the upper surface of the table. In order to operate the bar in one direction a cam 36 located on the shaft 37 supported in one of the brackets 32 and in the bracket 38 operates to push the bar 31 longitudinally at predetermined times in the operation of the machine. The return movement of the bar 31 is performed by the compression spring 39 located between the collar 40 and another of the brackets 32. The cam 36 is operated by a sprocket wheel 41 which is driven by a belt 42 that is connected through a suitable sprocket to the drive and time shaft 6, whereby the bar 31 is operated by the cam 36 at certain times with respect to the rotation of the cam 48 which is also connected to the shaft 6. The fingers are withdrawn to permit the pans that have collected on the receiving part 22 of the table to slide on to the movable part 23 of the table. The part 23 of the table is also provided with a means for engaging or retaining the pans on the said part. In the form of the construction shown, the said means consists of an electromagnetic device. In conjunction therewith a mechanical means may also be used to insure the detention of the pans on the movable part of the table. The electromagnetic means consists of a plurality of magnets 43 having poles 44 that extend some distance on each side of the coiled magnets and form a large magnetizing field or magnetic area in which the pans that are formed of a magnetic material, such as sheet iron, may be engaged and held by the magnetism produced by an electric current passing through the coils 43. The poles 44 of the magnets extend through the table and may be located in inserts 45 formed of plates of diamagnetic material, such as aluminum, to prevent short circuiting of the magnetic lines of force. The current through the coils 43 are established by the time that the fingers 29 release the pans from the receiving part 22 of the table, or shortly thereafter, and so that the pans will be magnetically engaged in the magnetic fields produced by the poles 44.

The coils 43 are located in the circuit that is closed at predetermined times in the operation of the machine. A switch 46 of any suitable design is conventionally illustrated in Figs. 3 and 7 of the drawings. It may be operated by the spring pressed pin 47, by way of example, which is moved by the operation of the cam 48. The cam 48 is located on the shaft 6, and the cam 48 operates to open the switch 46 during a short period of time, the switch being closed the major part of the rotation of the shaft 6 and the cam 48. As the pans slide over the part 23 they are soon stopped by the increased friction produced by the magnetization of the poles 44.

In order to insure that the pans do not slide from the table 21 the lower edge of the table, that is, the lower edge of the movable part 23, is provided with fingers or lips 49 which are constructed and operated similar to the lips or fingers 29. The lips or fingers 49 are connected to a rod 50 by means of links, like the links 30, and the rod 50 is operated by the cam 51 in the same manner that the fingers 29 are operated by the cam 36. The cam 51 is driven by means of a gear or sprocket chain 52 which is in turn driven by sprocket wheels located in line with the pintles that hinge the parts 22 and 23 of the table together, and by the sprocket chain 53 that drives the sprocket wheels rotatably connected to the said shafts in line with the pintles. The sprocket chain 53 is driven by sprocket wheels located on the shaft 37 to which the cam 36 is connected, and which is driven by the sprocket belt 42 that is connected to the main driving shaft 6. The raised portion of the cam 51 is timed with respect to the shaft 6, and particularly with respect to the cam 48 that the rod 50 and the switch 46 operates substantially at the same time, so that the pans may be released at the proper time, as hereinafter described, from the delivering edge of the table.

The table 23 is lowered to dump the bread contained in the pans when the pans are secured in position by the magnets 43. The cam 28 against which the roller 27 is pressed and which supports the movable part 23 of the table, is operated according to the contour of the periphery of the cam 28. The cam 28 operates to raise the part 23 of the table top in line with the part 22 to receive the pans from the part 22. It is subsequently lowered to the delivering point of the bread from the pans, and a sharp depression in the cam 28 operates to drop the part 23 of the table with a quick movement against the bumpers 54 which are supported in the frame 1 of the machine. The bumpers 54 are spring pressed by means of the springs 55. The return movement caused by the springs 55 may be also elastically resisted by means of the springs 56. The part 23 of the table strikes the bumpers when it is slightly below the apron 57 so that the bread is jarred out of the pans, notwithstanding the slight adherence that occurs between the bread and the pans. If desired, the bread may be delivered on to the apron 57. The bread may slide from the apron 57 upon a conveyor 58. This is preferably done when the pans are not provided with covers. If the pans are provided with covers, the pans are directed to the conveyor 58 as hereinafter described. The conveyor 58 is driven by sprocket chains 59 to which may be connected cross bars 60, and a wire screen or belt 61 may be secured to the bars 60, and if desired also to the sprocket chains 59. The sprocket chains are driven by the wheels 62 located on the shaft 63. The shaft 63 is supported in suitable bearings 64 and is driven by the sprocket chain 65 which is operated by the bevelled gear wheels 66 and the shaft 67. One of the bevelled gear wheels 66 is connected to the main drive shaft 6. In this way the bread is conveyed to any suitable point by means of the conveyor 58. If desired, the pans may be permitted to slide on to the conveyor 68, thus dropping below the apron 57, in which case the magnets 43 are demagnetized, and the fingers 49 depressed to release the pans and permit them to slide on to the conveyor 68 which is constructed and operated in the same way that the conveyor 58 is constructed and operated. The conveyor 68 is provided with sprocket chains 69 that are driven by means of wheels 70, also located on the shaft 63, which, as heretofore described, is connected to the main shaft 6, and thus the pans may be conveyed away to any desired point for the convenience of the bakers using the machine.

In the form of the construction shown, however, the pans 71 are provided with covers 72, and before the bread is dumped the covers 72 are removed. The pans containing the bread and the cover are raised by movement of the movable part 23 of the table, and the operation of the cam 28 so that the magnets 73 may magnetically engage the covers 72. Upon lowering the part 23 the pans 71 will be removed from the covers until the movable part 23 of the table strikes the bumper 54 and jars the bread on to one of the conveyors 58 or 68. In the form of construction shown the bread is dumped on to the conveyor 58, which occurs when the roller 27 rides into the recess 74 of the cam 28. The movable part 23 of the table is then raised in order that the covers 72 may be replaced on the pans 71, whereupon it is again lowered in order that the pans may be delivered on to the apron 57 and directed by the apron to the conveyor 58. This occurs when the roller rides into the recess 75 of the cam 28.

In order that the magnets 73 may release the covers for replacement of the covers on the pans their circuit is controlled by means of a cam 76 located on the shaft 6. The cam 76 operates on the pin 77 that operates the switch 78 which is constructed and operated in the same manner that the switch 46 is constructed and operated. The times of operation with respect to the movement of the machine is thus controlled so that the covers are released when the cam 28 raises the movable part 23 of the table the second time in a single revolution of the shaft 6, such as when the roller 27 rides on the part 79.

The magnets 73 are provided with the poles 80 that extend parallel to the delivery edge of the table. The magnets are supported on a plate 81 that is connected by bolts 82 to the arms 84 that overhang the movable part 23 of the table. The shelf thus formed is supported by means of arms 84. The plate 81 is spring pressed by the compression springs 85. This arrangement provides for any discrepancy as to the depth of the pans, particularly as to the height of the top of the covers above the table tops 23. It also enables the magnets 73 to tilt slightly in case the covers 72 are not placed in exact position with reference to the pans 71.

In the operation of the machine the pans are delivered from the oven 10 on to the conveyor 7 and delivered to the table 21, where they are engaged and held by the fingers or lips 29. The fingers are lowered by the operation of the cam 36 at the proper time in the operation of the machine and the pans are engaged by the magnets 43 having the poles 45, when they slide down the table. The table is divided into the two parts 22 and 23, the part 23 being raised and lowered by the cam 28 operating through the bars 25 and 26 to raise the pans so that the covers may be engaged by the magnets 73 which are magnetized by a suitable current controlled by the switch 78, whereupon the part 23 is lowered and bumped against the bumper 54 to jar the bread from the pans while the pans are being held by the magnets 43. The part 23 is then raised to raise the pans against the covers held by the magnets 73, whereupon the magnets 73 are released and the part 23 is again lowered until the part 23 is in line with the apron 57, whereupon the magnets 43 are demagnetized by the opening of the switch 46 which is operated by the cam 48. Also the fingers 49 are depressed and the pans slide upon the conveyor 58.

Many of the parts are provided with suitable adjusting means whereby their relations may be readily set, and particularly whereby the times of operations may be adjusted in order that the machine may produce the functions herein described.

I claim:

1. In a bread dumping machine, a table, a conveyor for conveying pans containing bread from the oven to the table, means retaining the pans in position until they may be moved synchronously with the operation of the machine, magnets for engaging and holding the pans, a bumper for jarring the bread from the pans while the pans are being held by the magnets.

2. In a bread dumping machine, a table, a conveyor for conveying pans containing bread from the oven to the table, means retaining the pans in position until they may be moved synchronously with the operation of the machine, magnets for engaging and holding the pans, a bumper for jarring the bread from the pans while the pans are being held by the magnets, means for demagnetizing the magnet to release the pans from the table.

3. In a bread dumping machine, a table, a conveyor for conveying pans containing bread from the oven to the table, means retaining the pans in position until they may be moved synchronously with the operation of the machine, magnets for engaging and holding the pans, the table having a non-magnetic material surrounding the poles of the magnets, a bumper for jarring the bread from the pans while the pans are held by the magnets.

4. In a bread dumping machine, a table, a conveyor for conveying pans having covers and conveying bread from the oven to the table, means for retaining the pans in position until they may be moved synchronously with the operation of the machine, magnets for engaging and holding the pans, and magnets for magnetically engaging the covers, a bumper for jarring the bread from the pans while the pans are being held by the first named magnets.

5. In a bread dumping machine, a table, a conveyor for conveying pans having covers and conveying bread from the oven to the table, means for retaining the pans in position until they may be moved synchronously with the operation of the machine, magnets for engaging and holding the pans, and magnets for magnetically engaging the covers, a bumper for jarring the bread from the pans while the pans are being held by the first named magnets, and means for replacing the covers on the pans.

6. In a bread dumping machine, a table, a conveyor for conveying pans containing bread from the oven to the table, magnets for engaging and holding the pans, a bumper for jarring the bread from the pans while the pans are being held by the magnets.

7. In a bread dumping machine, a table, a conveyor for conveying pans containing bread from the oven to the table, magnets for engaging and holding the pans, a cam for lowering and raising a part of the table, a bumper for bumping the part of the table and jarring the bread from the pans while the pans are being held by the magnets.

8. In a bread dumping machine, a table for receiving pans containing bread from the oven, magnets for engaging and holding the pans on the surface of part of the table, means for moving a part of the table, a bumper for jarring the bread from the pans while the pans are being held by the magnets.

9. In a bread dumping machine, a table for receiving pans containing bread from the oven, magnets for engaging and holding the pans on a part of the table, a cam for lowering and raising the part of the table, a time shaft for supporting the shaft, a bumper for jarring the bread from the pans while the pans are being held by the magnets, means connected to the time shaft for controlling the circuit of the magnets to release the pans from the part of the table.

10. In a bread dumping machine, a table for receiving pans having covers containing bread from the oven, magnets for engaging the covers, and magnets for engaging and holding the pans, means for moving a part of the table to separate the pans from the covers, a bumper for jarring the bread from the pans while the pans are being held by the second named magnets, means for returning the part of the table to return the pans to the covers.

11. In a bread dumping machine, a table for receiving pans having covers for containing bread from the ovens, a timing shaft, a cam located on the timing shaft for moving a part of the table, magnets for engaging and holding the pans, and magnets for engaging and holding the covers, a bumper for jarring the bread from the pans while the pans are being held by the first named magnets, means located on the timing shaft for opening the circuits of the second named magnets upon raising of the pans to the covers, and for opening the circuit of the first named magnets to release the covered pans from the table.

12. In a bread dumping machine, a table, a conveyor for conveying pans having covers containing bread from the oven to the table, magnets located on a part of the table for magnetically engaging the pans, a timing shaft, a cam located on the timing shaft to raise the pans and covers, a shelf, magnets located on the shelf for engaging the covers, the cam operating to lower the part of the table, a bumper for bumping the bread from the pans while the pans are held by the first named magnets, the cam operating to raise the cams to the covers and to subsequently lower the pans and covers, means located on the timing shaft for opening the circuit of the magnets to replace the covers on the pans and release the pans and covers from the table, conveyors for receiving the bread and pans having the covers thereon.

In testimony whereof, I have hereunto signed my name to this specification.

JOSEPH A. McGARRY.